Figure 1:
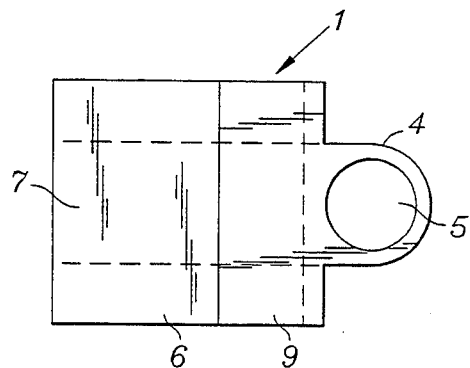

United States Patent [19]

Angele

[11] Patent Number: 5,344,028
[45] Date of Patent: Sep. 6, 1994

[54] STORAGE FOR DATA MEDIA, PARTICULARLY COMPACT DISCS (CDS)

[76] Inventor: Boris Angele, Holzweg 23, Herrsching, Fed. Rep. of Germany, D-8036

[21] Appl. No.: 977,412

[22] PCT Filed: Jun. 16, 1992

[86] PCT No.: PCT/DE92/00493
§ 371 Date: Feb. 17, 1993
§ 102(e) Date: Feb. 17, 1993

[87] PCT Pub. No.: WO92/22902
PCT Pub. Date: Dec. 23, 1992

[30] Foreign Application Priority Data

Jun. 17, 1991 [DE] Fed. Rep. of Germany ... 9107451[U]

[51] Int. Cl.5 .................................................. A47F 5/00
[52] U.S. Cl. ......................................... 211/40; 211/41;
211/168; 206/309; 312/9.58
[58] Field of Search ............... 211/40, 41, 168, 78;
206/310, 309, 387; 312/9.9, 9.15, 9.46, 9.58, 9.64

[56] References Cited

U.S. PATENT DOCUMENTS

| 4,331,242 | 5/1982 | Scott . | |
|---|---|---|---|
| 4,368,934 | 1/1983 | Somers | 312/9.58 X |
| 4,515,420 | 5/1985 | Grosch . | |

FOREIGN PATENT DOCUMENTS

| 951703 | 7/1974 | Canada . |
| 0141937 | 5/1985 | European Pat. Off. . |
| 0362485 | 4/1990 | European Pat. Off. . |
| WO92/03823 | 3/1992 | PCT Int'l Appl. . |
| 2071997 | 9/1981 | United Kingdom . |
| 2230939 | 11/1990 | United Kingdom . |

OTHER PUBLICATIONS

Bachman, W. H. and Erikson, G. D., "Magnetic Disk Container", IBM Technical Disclosure Bulletin 26(3A):1208–1209 (1983).

Primary Examiner—Robert W. Gibson, Jr.
Attorney, Agent, or Firm—Merchant & Gould

[57] ABSTRACT

A storage apparatus particularly for compact discs arranged in hinge boxes includes clip means having a U-shaped bracket. There are at least two legs spaced to correspond to the depth of the box. The brackets include a hole with a ring extension for receiving a rod insertable to hold the clip means and thereby stack the CDs on the rod.

25 Claims, 1 Drawing Sheet

STORAGE FOR DATA MEDIA, PARTICULARLY COMPACT DISCS (CDS)

This novel design concerns a storage for data media, particularly compact discs, which are separately arranged within hinged CD jewel boxes.

Practically all CDs on the market today are contained in jewel boxes to protect them from mechanical damage and dust when they are not in use. The jewel box also accepts printed inserts identifying the information recorded on the CD.

Due to the increasing popularity of compact discs in the area of recorded music, there are music fans who already own sizeable CD libraries. There are systems on the market today designed to handle these CDs. They are tower-type CD storages featuring separate compartments for storing the jewel boxes containing the CDs.

Such systems have their drawbacks as they require the jewel box itself to be removed from its compartment whenever a CD is to be used. If, after the disc has been played and returned to its jewel box, this jewel box is not inserted in the exact location in the storage from which it was previously removed, an existing optimal arrangement might be lost in the process. The danger of this happening is all the greater if a person who is unfamiliar with the system operates the CD player, e.g. during a party.

Thus this novel design is intended to provide a storage for data media, particularly CDs, which, rather than requiring the pertinent jewel box to be removed from the storage when a particular CD is to be played, allows that jewel box to remain in the storage so that an optimal arrangement, once found, cannot be lost.

The novelty of the design is detailed in the specification section of claim 1 listing the salient features.

Extended versions of this novelty are contained in Subclaims 2 through 10.

The following contains a detailed description of different design elements and characteristics with references to the attached figures.

Figure 2:
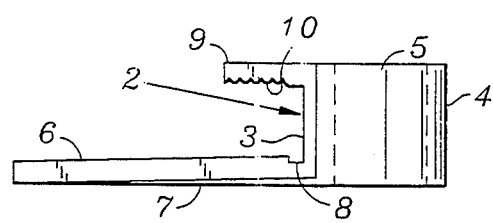
Figure 3:
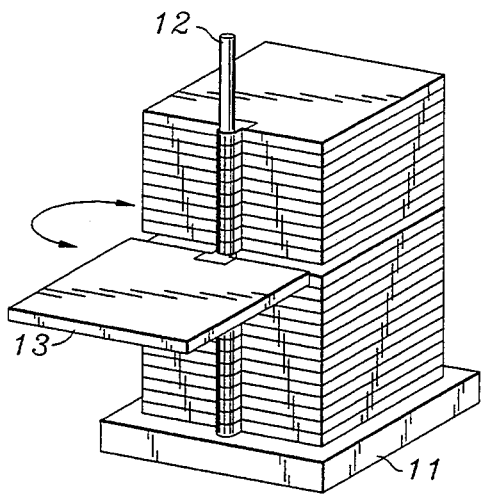
Figure 4:
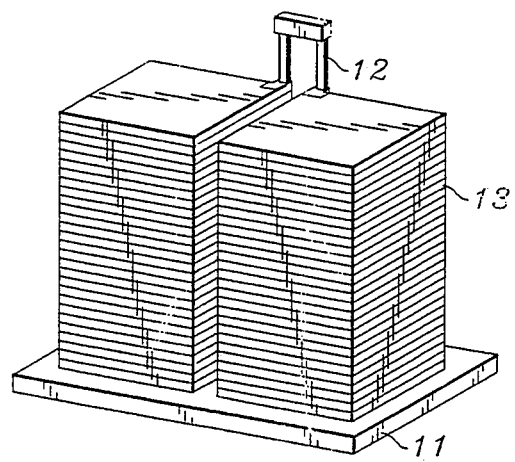

Figures:

FIG. 1—Plan view of a clip used in the novel design;
FIG. 2—Side view of the clip shown in FIG. 1;
FIG. 3—Perspective view of a CD jewel-box holder of the novel design;
FIG. 4—Perspective view showing a modified version of a CD jewel-box holder.

As can be seen from FIGS. 1 and 2, the main element of this novel design is a plastic clip (1) consisting basically of a U-shaped bracket (2). In its cross bar area (3), this bracket (2) features a ring extension (4) having a cylindrical hole (5).

The lower leg (6) of the bracket (2) extends outward resulting in a basically square configuration. This lower leg (6) is reinforced at the bottom with a bracing rib (7), which decreases in thickness toward the outer edge. The bracing rib (7) width basically corresponds to the ring extension (4) width. A transverse groove (8) is located at the inside of the lower leg (6) in the crossbar (3) junction area. The upper leg (9) of the U-shaped bracket (2) is correspondingly shorter in length, where the length of this upper leg (9) was calculated to allow for unobstructed opening of the upper lid when attaching the clip (1) a jewel box. The upper leg (9) further features, at its inside, a set of grooves (10), which correspond to the existing set of grooves at the top of the CD jewel boxes.

The clip (1) shown in FIGS. 1 and 2 can be attached to the commonly available plastic CD jewel boxes simply by sliding the two legs (6) and (9) of the U-shaped bracket (2) sideways onto the hinge edge of the CD jewel box. This causes the transverse groove (8) at the inside of the lower leg (6) to engage in the existing edge strip of the corresponding CD jewel box while the set of grooves (10) provided at the inside of the upper leg (9) engages simultaneously in the existing set of grooves at the top of the CD jewel box. In addition, the two legs (6) and (9) of the U-shaped bracket (2) are sufficiently flexible to allow the U-shaped bracket (2) to securely grip the edge of the corresponding CD jewel box. The bracing rib (7) located at the bottom of the lower leg (6) of the U-shaped bracket (2) provides additional stability when the clip (1) locks onto the CD jewel box.

The jewel boxes, each equipped with a clip (1), can then be stored by inserting a rod through the hole (5) provided within the ring extension (4), thus allowing multiple jewel boxes with corresponding clip (1) to be held along this rod. This rod may be installed horizontally in an existing piece of furniture, where it may be supported either in the center or along its two ends. A given CD can now be removed by selecting a jewel box from the stack hanging down and swinging it out and up using the existing rod as a pivot. The jewel box selected in this manner may now be opened and the CD removed for playback.

However, vertical storage of the individual jewel boxes is the preferred method in this novel design. A jewel box holder as per FIG. 3 has been provided for this purpose. This jewel box holder is equipped with a relatively massive bottom plate which serves as a base for a rod (12) installed off-center. The diameter of this rod (12) essentially corresponds to the hole (5) within the ring extension (4) of the clip (1), allowing the clips (1) with the attached jewel boxex (13) to be slid onto the rod (12) from the top. In order to remove an individual CD from the stack of CD jewel boxes (13), the corresponding jewel box (13) must be swung out of the existing stack of CD jewel boxes with the rod (12) serving as an axis for this process. Preferably, the clips (1) should be attached to the jewel boxes (13) at the center facilitating CD removal from the individual jewel boxes (13).

FIG. 4 shows another jewel-box holder design. In this design, two rods (12) extend upward from the existing bottom plate (11) with the interspace between these two rods (12) being relatively small. The clips (1) are attached off-center to the jewel boxes (13) so that two stacks of jewel boxes (13) can be set up on two rods (12) side by side. Individual CDs are removed in the same manner, i.e. by swinging a jewel box (13) out of the jewel box stack and removing the desired CD.

To provide an attractive exterior as well as to better project the individual jewel boxes (13), the jewel box holders shown in FIGS. 3 and 4 may be enclosed within a square housing which allows the front cover and at least one of the two side covers to be swung out to the side. In this case, the provided rods (12) must be located at the front of the housing in order to allow individual CD jewel boxes (13) to be swung out after the front and side covers have been swung out to the side.

The clip shown in FIG. 1 and 2 can be provided as a component of the CD package when the CD is purchased in which case this clip (1) will be attached to the jewel box (13) by the dealer. As an added attraction, a string or a plastic ring may be inserted through the existing hole (5) of the ring extension (4) of the clip (1)

for carrying the purchased CD from the store minus a plastic bag.

This string or the plastic ring may then also accommodate promotional material or the sales receipt so that no one-way bags will be needed.

I claim:

1. Storage apparatus for data media, particularly compact discs, separately arranged with hinged boxes, the apparatus comprising clip means for attaching to the boxes in the hinged area of the box, the clip means including a U-shaped bracket having at least two legs with spacing corresponding to a depth of each box and one leg being larger than the other leg, and the brackets being provided with a hole within a ring extension for receiving a rod insertable to hold the clip means.

2. Apparatus as claimed in claim 1 wherein the clip means each contain a ring extension having a hole, and wherein the ring extension includes an added thickness for facilitating a rotation of the clip means.

3. Apparatus as claimed in claim 1 including clip means being a U-shaped bracket for attaching sideways relative to the hinged area of the box.

4. Apparatus as claimed in claim 2 including clip means being a U-shaped bracket for attaching sideways relative to the hinged area of the box.

5. Apparatus as claimed in claim 1 wherein the clip means includes a lower leg extending to provide a contact surface for an individual box.

6. Apparatus as claimed in claim 2 wherein the clip means includes a lower leg extending to provide a contact surface for an individual box.

7. Apparatus as claimed in claim 3 wherein the clip means includes a lower leg extending to provide a contact surface for an individual box.

8. Apparatus as claimed in claim 3 wherein the U-shaped bracket includes a lower leg having a transverse groove means on an inside area adjacent to a cross-member of the U-shaped element, the groove means being for engaging an edge strip of the box.

9. Apparatus as claimed in claim 4 wherein the U-shaped bracket includes a lower leg having a transverse groove means on an inside area adjacent to a cross-member of the U-shaped element, the groove means being for engaging an edge strip of the box.

10. Apparatus as claimed in claim 5 wherein the U-shaped bracket includes a lower leg including a bracing rib.

11. Apparatus as claimed in claim 1 wherein the U-shaped bracket includes an upper leg, the upper leg having groove means on an inside surface for engaging with the hinged area of the box.

12. Apparatus as claimed in claim 3 wherein the U-shaped bracket includes an upper leg, the upper leg having groove means on an inside surface for engaging with the hinged area of the box.

13. Apparatus as claimed in claim 5 wherein the U-shaped bracket includes an upper leg, the upper leg having groove means on an inside surface for engaging with the hinged area of the box.

14. Apparatus as claimed in claim 8 wherein the U-shaped bracket includes an upper leg, the upper leg having groove means on an inside surface for engaging with a hinged area of a box.

15. Apparatus as claimed in claim 1 including a base plate for an upright rod, the upright rod being for receiving multiple clip means.

16. Apparatus as claimed in claim 5 including a base plate for an upright rod, the upright rod being for receiving multiple clip means.

17. Apparatus as claimed in claim 8 including a base plate for an upright rod, the upright rod being for receiving multiple clip means.

18. Apparatus as claimed in claim 11 including a base plate for an upright rod, the upright rod being for receiving multiple clip means.

19. Apparatus as claimed in claim 1 including a base plate and a pair of upright rods for receiving multiple clip means, the rods being relatively narrowly spaced apart.

20. Apparatus as claimed in claim 1 wherein there is an upper leg and a lower leg and wherein the lower leg is the larger leg.

21. Apparatus as claimed in claim 1 wherein the legs include a transverse plane extending in at least two perpendicular directions from an axis through the hole in the ring extension, and wherein the larger leg extends a larger distance in at least one of the perpendicular directions.

22. Apparatus as claimed in claim 21 wherein the larger leg is larger in both the perpendicular directions.

23. Apparatus is claimed in claim 21 wherein the one perpendicular direction of the larger leg is in a perpendicular direction away from a base of the U-shaped bracket.

24. Storage apparatus for data media, particularly compact discs, separately arranged with hinged boxes, the apparatus comprising clip means for attaching to the boxes in the hinged area of the box, the clip means including a U-shaped bracket having at least two legs with spacing corresponding to a depth of each box and one leg being larger than the other leg, the brackets being provided with a hole within a ring extension for receiving an upright rod insertable to hold the clip means, and a base plate for receiving the upright rod, the upright rod being for receiving multiple clip means in a stacked relationship, the rod having two ends, one end of the rod being for engagement with the base plate, and the other end being free standing, and the base means being sufficiently large that the base and rod combination alone is enabled to support multiple clips for hinged boxes attached to the clips.

25. Apparatus is claimed in claim 24 wherein the rod can accommodate at least 20 clips in adjacent relationship.

* * * * *